(12) United States Patent
Kernchen et al.

(10) Patent No.: US 8,800,504 B2
(45) Date of Patent: Aug. 12, 2014

(54) VEHICLE COOLING CIRCUIT HAVING A RETARDER OR A HYDRODYNAMIC CLUTCH

(75) Inventors: Reinhard Kernchen, Satteldorf (DE); Werner Adams, Crailsheim (DE)

(73) Assignee: Voith Patent GmbH, Heidenheim (DE)

( * ) Notice: Subject to any disclaimer, the term of this patent is extended or adjusted under 35 U.S.C. 154(b) by 225 days.

(21) Appl. No.: 13/144,329

(22) PCT Filed: Jan. 18, 2010

(86) PCT No.: PCT/EP2010/000234
§ 371 (c)(1),
(2), (4) Date: Sep. 1, 2011

(87) PCT Pub. No.: WO2010/081728
PCT Pub. Date: Jul. 22, 2010

(65) Prior Publication Data
US 2011/0315097 A1    Dec. 29, 2011

(30) Foreign Application Priority Data
Jan. 19, 2009    (DE) .................. 10 2009 005 504

(51) Int. Cl.
*F01P 5/10*    (2006.01)
(52) U.S. Cl.
USPC ......................................... 123/41.44; 188/293
(58) Field of Classification Search
USPC ............... 123/41.44; 188/296, 293, 294, 295; 192/3.23, 3.34, 216; 60/348, 350, 366, 60/330, 336, 357
See application file for complete search history.

(56) References Cited

U.S. PATENT DOCUMENTS

| | | | | |
|---|---|---|---|---|
| 3,650,358 A | * | 3/1972 | Bessiere | ................. 188/296 |
| 3,720,372 A | * | 3/1973 | Jacobs | ................. 237/12.3 B |
| 3,958,671 A | | 5/1976 | Muller | |

(Continued)

FOREIGN PATENT DOCUMENTS

| | | |
|---|---|---|
| CN | 1910383 | 2/2007 |
| DE | 1 480 318 | 7/1969 |

(Continued)

OTHER PUBLICATIONS

DE3713580C1 : English Translation of reference—DE3713580C1 (Nov. 10, 1988).*

(Continued)

*Primary Examiner* — Hung Q Nguyen
(74) *Attorney, Agent, or Firm* — Faegre Baker Daniels LLP

(57) ABSTRACT

A vehicle cooling circuit, especially an engine cooling circuit, including a cooling medium pump and a vehicle drive engine and/or other heat-generating assembly cooled by means of the cooling medium. The circuit includes a hydrodynamic retarder with the working medium of the hydrodynamic retarder simultaneously also being the cooling medium of the cooling circuit, and the hydrodynamic retarder operating as the cooling medium pump. The secondary blade wheel is associated with a brake or a drive running counter to the drive of the primary blade wheel in such a way that it can optionally be fixed in a first operating state (braking operation) or be driven counter to the rotational direction of the primary blade wheel and, in a second operating state (pumping operation), can partially or completely be released such that it circulates at the speed of the primary blade wheel or at a specified speed difference slower than the primary blade wheel.

18 Claims, 6 Drawing Sheets

(56) References Cited

U.S. PATENT DOCUMENTS

| | | | |
|---|---|---|---|
| 4,493,293 A | 1/1985 | Paul et al. | |
| 4,744,443 A | 5/1988 | Brosius | |
| 4,773,513 A * | 9/1988 | Herrmann et al. | 188/296 |
| 5,779,008 A * | 7/1998 | Vogelsang et al. | 188/296 |
| 5,829,562 A * | 11/1998 | Adams et al. | 192/218 |
| 7,341,026 B2 | 3/2008 | Laukemann | |
| 7,757,485 B2 | 7/2010 | Kley | |
| 2007/0131181 A1* | 6/2007 | Vogelsang | 123/41.1 |
| 2009/0113886 A1 | 5/2009 | Laukemann et al. | |
| 2010/0282559 A1 | 11/2010 | Hoffeld | |

FOREIGN PATENT DOCUMENTS

| | | | |
|---|---|---|---|
| DE | 32 41 835 | 2/1984 | |
| DE | 3713580 C1 * | 11/1988 | F01P 5/10 |
| DE | 44 08 349 | 8/1995 | |
| DE | 103 15 402 | 11/2004 | |
| DE | 103 46 066 | 4/2005 | |
| DE | 10 2006 021 331 | 11/2007 | |
| FR | 2 253 948 | 7/1975 | |
| WO | 2009/0070692 | 1/2009 | |

OTHER PUBLICATIONS

Chinese Office Action dated Apr. 15, 2013 in corresponding Chinese Application No. 201080004793.4, together with English language translation of same.

International Search Report and Written Opinion dated Apr. 8, 2010 in PCT/EP2010/000234.

* cited by examiner

FIG_1

VEHICLE COOLING CIRCUIT HAVING A RETARDER OR A HYDRODYNAMIC CLUTCH

The invention relates to a vehicle cooling circuit, especially an engine cooling circuit of a truck, passenger car, rail vehicle or any other motor vehicle, comprising a hydrodynamic retarder for hydrodynamic braking or a hydrodynamic coupling for hydrodynamic driving of the vehicle, which means for traction or for driving a unit of the vehicle.

Cooling circuits in which a hydrodynamic retarder is arranged are known. The document DE 103 46 066 A1 describes a vehicle cooling circuit comprising a cooling medium pump, by means of which a cooling medium is circulated for cooling an internal combustion engine, and a hydrodynamic retarder, with the working medium of the retarder simultaneously being the cooling medium of the cooling circuit. In this case, the retarder simultaneously represents the cooling medium pump.

The document DE 44 08 349 C2 describes a similar arrangement, with the retarder also being filled with working medium in non-braking operation.

Although the known vehicle cooling circuits already show low power losses, there is still room for further improvements. It has been noticed that the described retarders occasionally show adverse efficiency in pumping operation (non-braking operation). This was due to the fact up until now that the flow behavior of the retarder in non-braking operation substantially corresponded to the one in retarder operation. As a result, flow-related losses which are certainly desirable in conventional braking operation and contribute to optimal retardation of the vehicle have a negative effect on efficiency in pumping operation, i.e. when the retarder is not used for braking.

It is therefore the object of the present invention to provide a vehicle cooling circuit which avoids the disadvantages of the state of the art. In particular, a hydrodynamic retarder shall be provided which offers high efficiency as a pump in non-braking operation and can be used as a supplementary pump in the cooling circuit in addition to a conventional rotation pump.

The object in accordance with the invention is achieved by a cooling circuit according to the independent claims. The dependent claims represent preferred embodiments of the invention.

The vehicle cooling circuit in accordance with the invention, e.g. an engine cooling circuit, comprises a cooling medium circulated by a cooling medium pump in a cooling circuit, and a vehicle drive engine and/or other heat-generating assembly cooled by means of the cooling medium. A hydrodynamic retarder is provided in accordance with the invention, comprising a driven primary blade wheel and a secondary blade wheel, together forming a toroidal workspace that can optionally be filled with a working medium and from which said working medium can be discharged as desired in order to transfer torque hydrodynamically from said primary blade wheel to said secondary blade wheel, wherein said working medium of the hydrodynamic retarder is also the cooling medium of the cooling circuit and the hydrodynamic retarder also operates as the cooling medium pump or as an additionally provided cooling medium pump, and brings about a pumping effect on the cooling medium for circulating the cooling medium in the cooling circuit. In accordance with the invention, the secondary blade wheel is associated with a brake or a drive running counter to the drive of the primary blade wheel in such a way that it can optionally be fixed in a first operating state (braking operation) or be driven counter to the rotation direction of the primary blade wheel in order to hydrodynamically brake the primary blade wheel and, in a second operating state (pumping operation), can be partially or completely released such that it circulates at the speed of the primary blade wheel or at a predetermined speed difference slower than the primary blade wheel together with the primary blade wheel in the same direction.

As a result of the measure of fixing or the driving of the secondary wheel in the opposite direction in braking operation, the formation of a circuit flow with a meridian component in the workspace is substantially achieved. The fixing of the secondary blade wheel corresponds to a slippage of 100%, whereas the driving of the secondary wheel in the opposite direction especially with the same or slightly different speed as the primary blade wheel corresponds to a slippage of approximately 200%. On the other hand, no respective hydrodynamic circuit flow which brakes the primary wheel is formed in pumping operation by the equidirectional and especially free circulation or entrainment of the secondary blade wheel. The primary wheel can thus work in an unbraked manner as a cooling medium pump.

In an especially advantageous manner, the primary blade wheel carries a rear blading for accelerating and conveying cooling medium on a side facing away from the workspace. The blades of the rear blading can extend over the entire outside circumference of the primary blade wheel, or they can be provided on only a part (e.g. in the region of the regional center) and can be arranged especially integrally with the primary blade wheel.

Preferably, blades of the primary blade wheel which are adjacent to one another and are positioned within the workspace delimit a working blade chamber and mutually adjacent blades of the rear blading form a rear blade chamber, with the working blade chamber and the rear blade chamber being in flow connection with one another via openings in the primary blade wheel. The openings form a working medium inlet and a working medium outlet, so that working medium will flow out of the workspace and thus out of the working blade chamber, or a plurality of working blade chambers, through the working medium outlet and will flow back via the blades of the rear blading and the working medium inlet into the workspace. Preferably, the working medium outlet is provided radially on the inside in the primary blade wheel in the region of the front side of the blades of the primary blade wheel with respect to the rotational direction of the primary blade wheel, whereas the working medium inlet is introduced in the primary blade wheel radially on the outside in the region of the rear side of the blades of the primary blade wheel. It is ensured as a result of this arrangement that working medium of higher pressure which flows about the front side of the blade (pressure side) will flow radially from the inside out of the workspace through the working medium outlet and is accelerated by the rear blading radially to the outside. From there it flows through the working medium inlet back into the workspace, with the pressure on the rear side of the blades of the primary blade wheel being lower than on the front side, so that working medium is "sucked" into the workspace. The efficiency and thus the pumping effect of the retarder are thus improved considerably.

Preferably, a further cooling medium pump is provided in the vehicle cooling circuit.

In accordance with an alternative embodiment of the invention, a vehicle cooling circuit such as an engine cooling circuit for example comprises a cooling medium which is revolved in a circuit by means of a cooling medium pump, and a vehicle drive engine and/or other heat-generating assembly cooled by means of the cooling medium. A hydrodynamic retarder is further provided, comprising a driven primary blade wheel and a secondary blade wheel, jointly forming a toroidal workspace that can optionally be filled with a working medium and from which said working medium can be discharged as desired in order to transfer torque hydrodynamically from said primary blade wheel to said secondary blade wheel, wherein said working medium of the hydrodynamic coupling is also the cooling medium of the cooling circuit, and the secondary blade wheel of the hydrodynamic coupling is connected with the cooling medium pump in a torsion-proof manner. In accordance with the invention, the secondary blade wheel is associated with a brake or a drive running counter to the drive of the primary blade wheel in such a way that it can optionally be fixed in a first operating state (braking operation) or driven counter to the rotation direction of the primary blade wheel in order to hydrodynamically brake the primary blade wheel and, in a second operating state (pumping operation), can be partially or completely released such that it circulates approximately at the speed of the primary blade wheel or at a specified speed difference slower than the primary blade wheel together with the primary blade wheel in the same direction.

The invention will now be explained by reference to embodiments, wherein.

Figure 1:
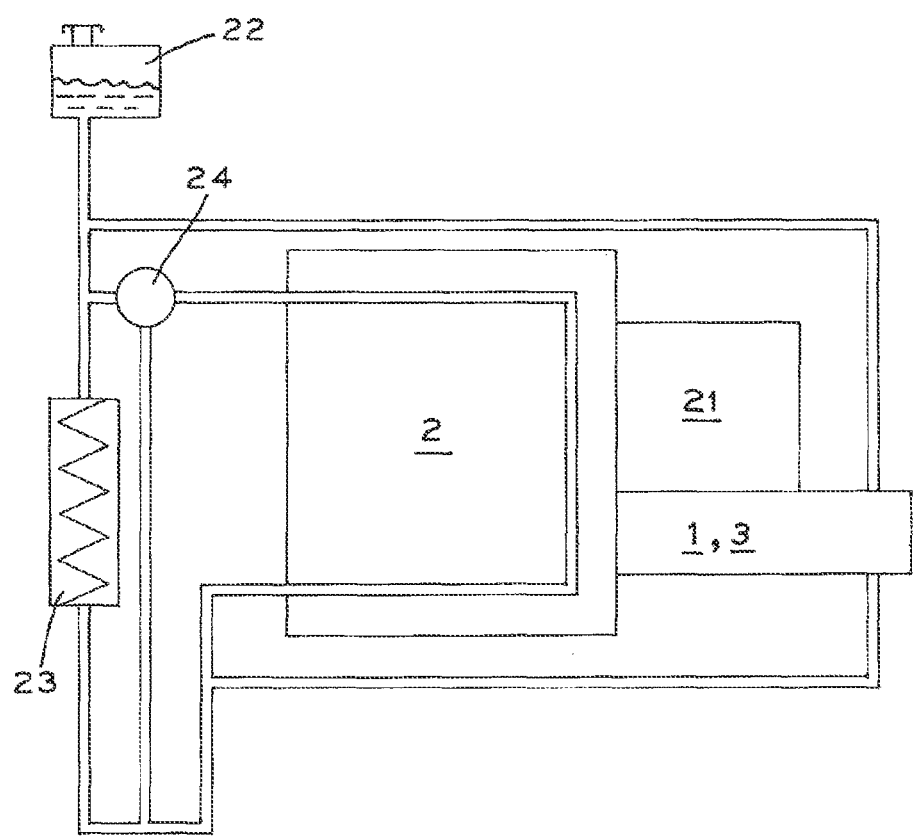
FIG. 1 shows a schematic view of a vehicle cooling circuit in accordance with the invention.

FIG. 1 shows a schematic view of a vehicle cooling circuit in accordance with the invention. A vehicle drive engine 2, a thermostat 24 and heat exchanger 23 are switched behind one another as seen in the direction of flow of the cooling medium. Furthermore, a compensating reservoir for the working medium 22 is provided. In this case, a hydrodynamic retarder 3 is switched in parallel to the vehicle drive engine 2 in the cooling circuit, the working medium of which is simultaneously the cooling medium. The cooling medium can be water, oil or a water mixture. In this case, the hydrodynamic retarder 3 is arranged as a primary retarder, which means that it retards the drive or crankshaft of the vehicle drive engine 2, which engine can be arranged as a diesel engine for example, in an especially direct way by circumventing a transmission 21 or by being coupled to the primary side of the transmission 21. An arrangement as a secondary retarder would also be possible. In this case it would be in a drive connection with the output side of the transmission 21, especially a power take-off shaft of the transmission 21 or a universal shaft behind the transmission 21.

Retarder 3 works in non-braking operation and especially also in braking operation as a cooling medium pump 1. It can thus be used alone for circulating the cooling medium. An additional cooling medium pump (not shown) can alternatively be provided, so that the retarder 3 will then work as a supplementary or supporting pump.

Figure 2:
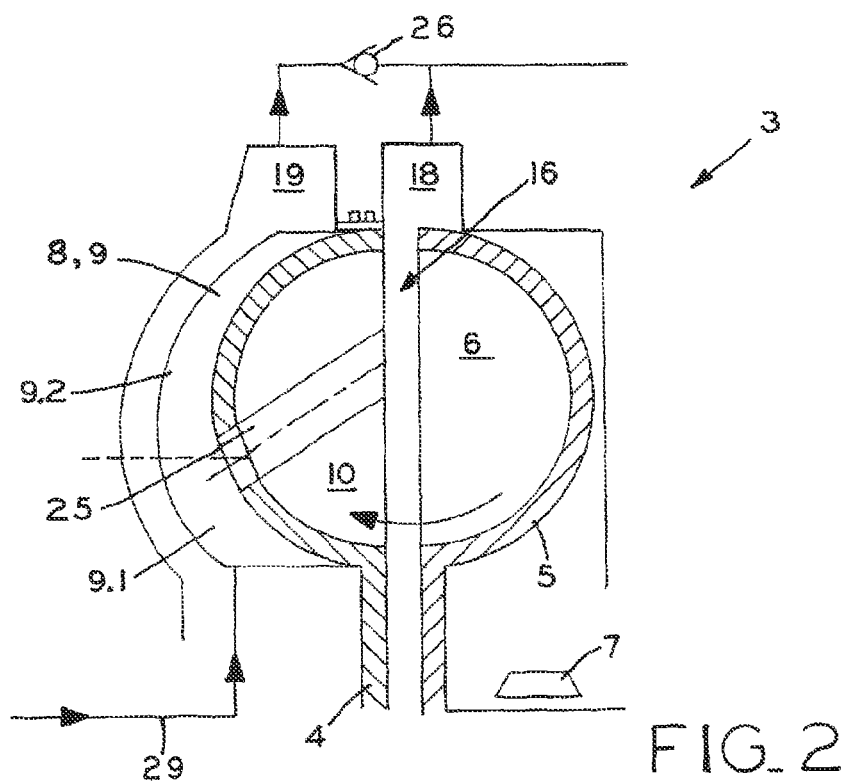
FIG. 2 shows a first embodiment of a retarder in accordance with the invention.

FIG. 2 shows an especially preferred configuration of the hydrodynamic retarder 3 according to a first embodiment. It comprises a primary blade wheel 4 and secondary blade wheel 5, which form a toroidal workspace which can be discharged and filled especially from the outside with working medium. Filling of the workspace 6 both in pumping operation as well as braking operation occurs via a feed line 29 and a working medium inlet 25 introduced into the primary blade wheel 4 which is connected with the feed line 29 in a manner conducting the working medium. In this case, the working medium inlet 25 is arranged as an oblique borehole, which means it is arranged at an angle in relation to the longitudinal axis of the retarder. For example, the working medium inlet 25 can be introduced in a blade 10 or a plurality of blades 10 of the primary blade wheel 4. The primary blade wheel 4 and the secondary blade wheel 5 form a separating gap 16 with their mutually facing sides, which gap communicates with a working medium outlet 18 for discharging working medium from the workspace 6. The working medium outlet 18 is arranged here radially on the outside and encloses the separating gap 16.

As is shown in FIG. 2, the primary blade wheel 4 carries a rear blading 8 on its side facing away from the workspace 6, which blading comprises a plurality of blades 9. They are used to increase the conveying volume flow through the retarder especially in pumping operation, which means during an operating state in which the retarder 3 is not used for hydrodynamic braking by transferring torque from the primary blade wheel 4 to the secondary blade wheel 5. For this purpose, working medium which flows via the feed line 29 is taken hold of by the radially inner part 9.1 of the blades 9 independent of the operating state of the retarder and is accelerated radially to the outside. For this purpose, the primary blade wheel 4 can permanently be in a drive connection with the vehicle drive engine via a drive shaft (not shown), or it can be brought into such a drive connection. The working medium then leaves the blades 9 in the radially outermost regions 9.2 of the rear blading 8 and flows into an annual channel or a spiral channel 19 for example which is arranged in this case radially on the outside on the primary blade wheel 4.

In the present case, the annular channel or the spiral channel 19 and the working medium outlet 18 are mutually sealed in the region of the separating gap 16, so that working medium cannot pass from the separating gap 16 to the annular channel/spiral channel 19. In this case however, the working medium outlet 18 and the spiral channel 19 are connected with one another radially further to the outside in a manner guiding the working medium and are switched especially in parallel. A non-return valve 26, which prevents the return flow of working medium into the spiral channel 19, can be provided in the flow-conducting connection.

For example, the secondary blade wheel 5 can be associated with a brake 7 which allows completely fixing the secondary blade wheel especially in braking operation of the retarder 3 and partly or fully releasing the same in pumping operation. The brake 7 can be associated with a control apparatus (not shown), by means of which the braking torque can be set to a higher or lower extent. In addition or alternatively to the brake 7, a drive apparatus can be provided (not shown) which drives the secondary blade wheel 5 in braking operation of the retarder in opposite direction to the primary blade wheel 4, with a slippage of 200% being achievable in this case. As a result of the driving of the primary blade wheel 5 in the opposite direction or the fixing of the same, a circuit flow is generated in the workspace 6 which hydrodynamically retards the primary blade wheel 4. At the same time, the rear blading 8 conveys cooling medium, with the conveying capacity depending on the speed of the primary blade wheel 4. In the second operating state, which is the pumping operation, the secondary blade wheel 5 can then be released or driven in such a way that it revolves jointly with the primary blade wheel 4 in the same direction and especially with the same speed. As a result of the driving in the same direction or the free entrainment of the secondary blade wheel 5, no significant circuit flow is produced in the workspace 6. The two blade wheels 4, 5 now act exclusively as a pump. As a result of the parallel switching of the spiral channel 19 and the working medium outlet 18, the conveying capacity of the retarder 3 is increased.

Figure 4A:
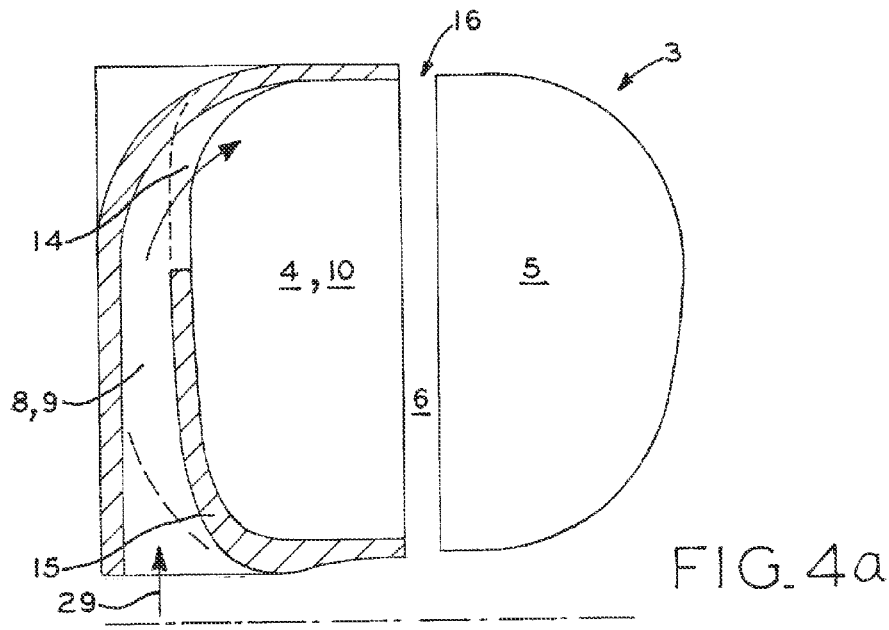
FIGS. 4a, 4b show a further embodiment by further development of the embodiment according to FIG. 2.
Figure 4B:
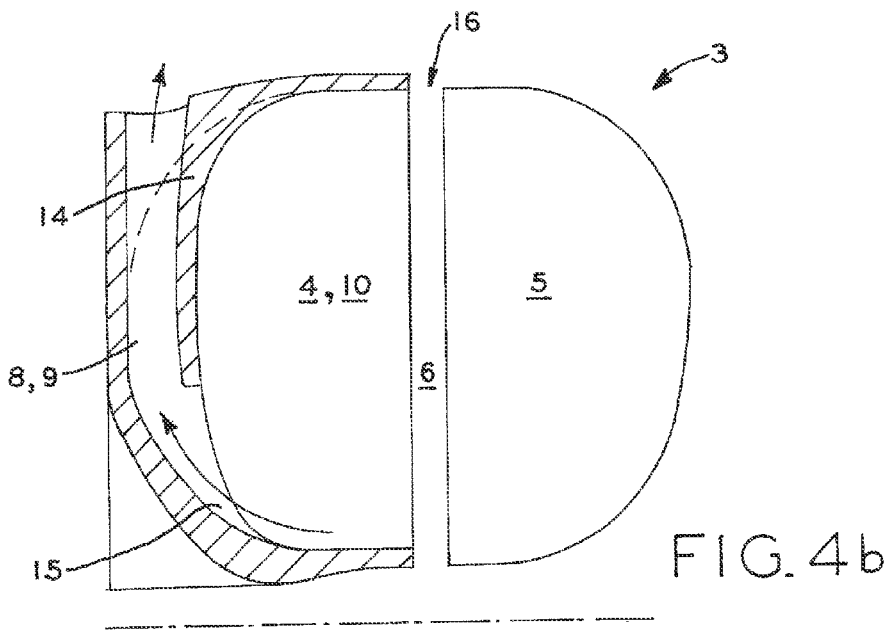

FIGS. 4a, 4b, 5 and 5a show an especially advantageous embodiment according to a further development of the configuration as shown in FIG. 2. The same components are provided with the same reference numerals as in the preceding drawings. As is shown in FIGS. 4a and 4b and as seen in an axial sectional view through the retarder, the primary blade wheel 4 comprises in the radially inner region an opening extending substantially in the tangential direction of the outer circumference of the workspace 6, which opening represents a working medium outlet 15. Similarly, the primary blade wheel 4 forms such an opening in the radially outer region which is used as a working medium inlet 14. FIG. 4a shows a sectional view which is arranged in an offset manner in the circumferential direction as compared with the sectional view of FIG. 4b, which offset is provided by a rear blade chamber 12 which will be explained below with reference to FIG. 5.

Furthermore, a rear blading 8 is shown which comprises a plurality of blades 9 of the primary blade wheel 4. Working medium can be supplied from the cooling circuit via the feed line 29 to the blades 9, from where it is accelerated radially to the outside as a result of the rotation of the primary blade wheel 4, as has already been described above. In this case a partial flow of the working medium will enter the workspace 6 via the working medium inlet 14 depending on the operating state of the hydrodynamic retarder 3 and especially into a working blade chamber 11 (see FIGS. 5 and 5a) which is formed by two mutually adjacent blades 10. The working medium of the circuit flow enters the secondary blade wheel 5 radially on the outside in the region of the separating gap 16 and from there radially on the inside back into the primary blade wheel 4, from where it leaves the workspace 6 again through the working medium outlet 15. The remaining partial flow of the working medium flows through the rear blading 8 without flowing through the workspace 6 radially to the outside and is discharged for example into the annular channel/spiral channel 19 of FIG. 2.

Figures 5, 5A:
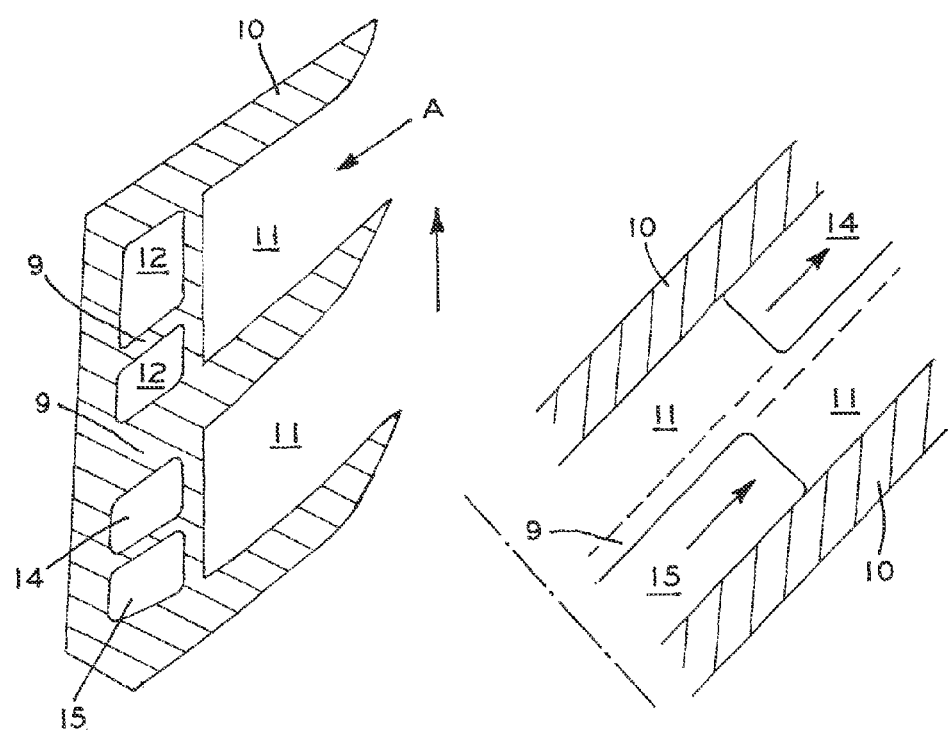
FIG. 5 shows a developed view of a region of the primary blade wheel of a retarder in accordance with the invention according to FIG. 4.
FIG. 5a shows a detailed view in the direction of view A of FIG. 5.

FIG. 5 shows a developed view of the primary blade wheel 4 of FIG. 4 and a top view in the radial direction as seen from the outside to the inside. The drawing shows the working blade chambers 11 delimited by the blades 10 of the primary blade wheel 4 and the rear blade chambers 12 delimited by the blades 9 of the rear blading 8. In the present case, blades 9 are arranged between the blades 10 of the primary blade wheel 4 and blades 9 are arranged in the region of the blade root of the blades 10 of the primary blade wheel 4. As a result, twice as many blades 9 are provided than blades 10. The blades 9 can be arranged parallel to or in alignment with the blades 10.

The working medium outlet 15 is arranged here in the region of the front side of the blade 10 (with respect to the direction of rotation (see arrow)), whereas the working medium inlet 14 is arranged in the region of the rear side 10 of the blades 10 of the primary blade wheel. FIG. 5a illustrates the radially outer arrangement of the working medium inlet 14 according to the view A of FIG. 5 and the radially inner arrangement of the working medium outlet 15 with respect to the illustrated longitudinal axis (rotational axis) of the hydrodynamic retarder 3.

Figure 3:
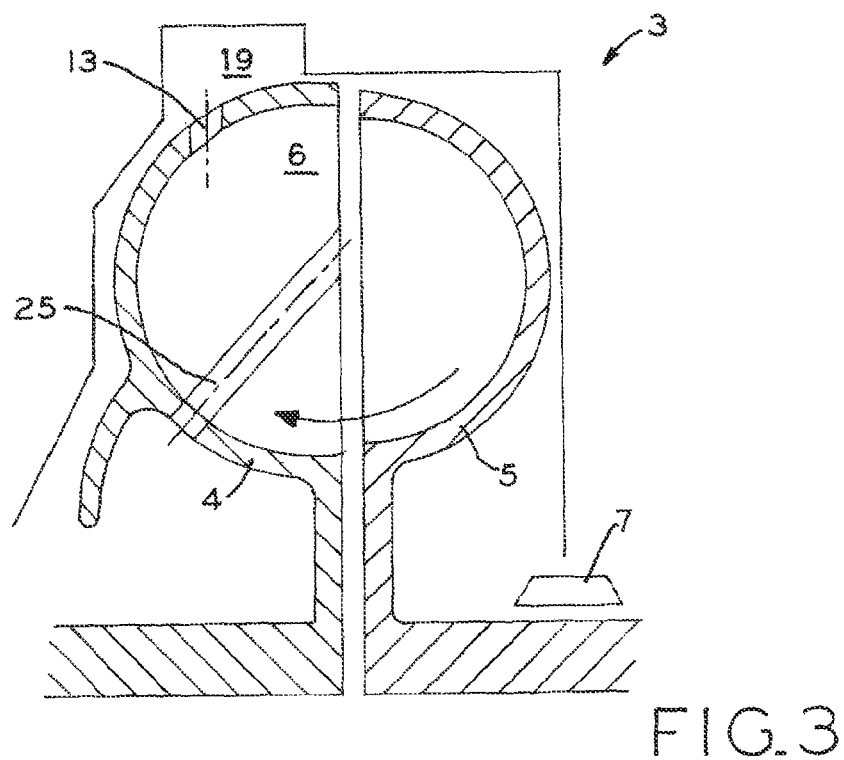
FIG. 3 shows a further embodiment of a retarder in accordance with the invention.

FIG. 3 shows a further embodiment of a hydrodynamic retarder 3 in accordance with the invention. The rear blading as shown in the preceding drawings is omitted in this case. Instead, merely the pumping effect of the blading of the primary blade wheels 4 and the secondary blade was 5 will be utilized. For this purpose, the workspace 6 is supplied with working medium via the working medium inlet 25 in pumping and in braking operation, by means of which a circuit flow forms in the workspace 6. In order to discharge the working medium in pumping operation, the primary blade wheel 4 comprises openings 13 in the radially outer region, through which the working medium of the circuit flow will exit and be discharged substantially in the radial direction out of the workspace 6 tangentially to the circuit flow. As has already been described, the discharged working medium can flow into the annular channel/spiral channel 19. For example, valves can be provided by means of which the flow cross-section of the openings 13 can be varied, such that in braking operation of the hydrodynamic retarder 3 for example the openings 13 can especially be blocked completely, whereas the openings 13 are partly or completely released in non-braking operation. Furthermore a brake 7 or a drive (not shown) for fixing or driving the secondary blade wheel 5 is provided.

Figure 6:
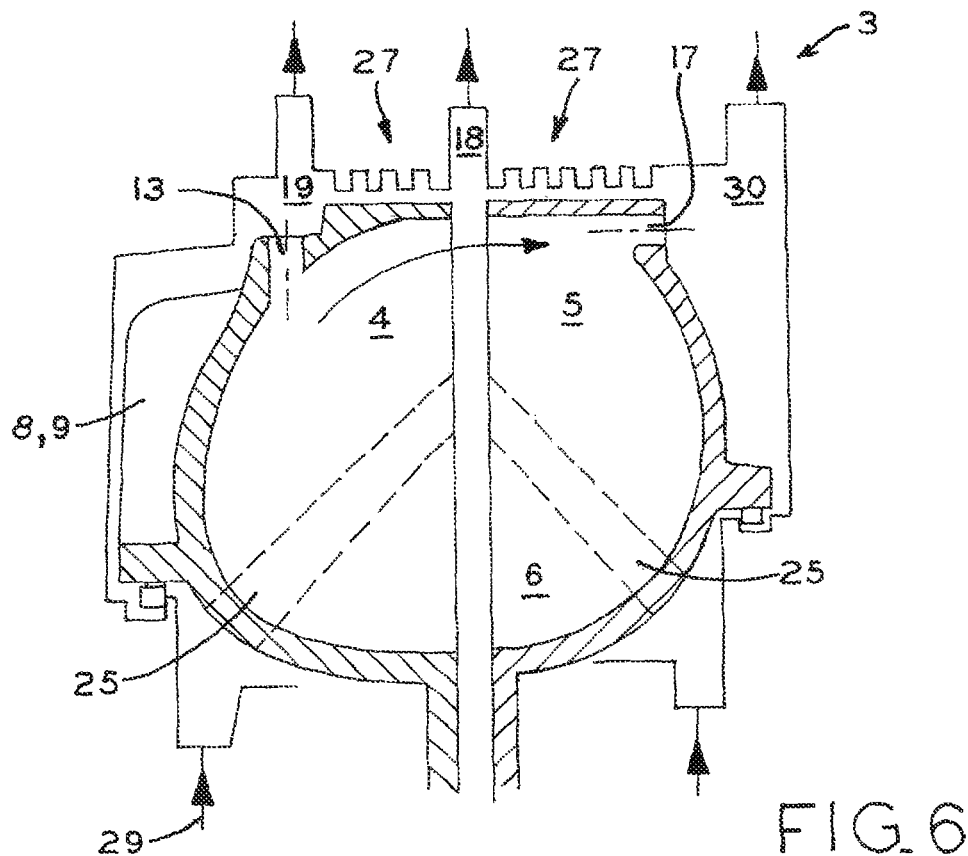
FIG. 6 shows a further embodiment of a retarder in accordance with the invention.

FIG. 6 shows a further embodiment of a retarder 3 in accordance with the invention with a combination of the features of the preceding embodiments. The same features are provided in this case too with the same reference numerals. As can be seen, openings 17 are provided in the secondary blade wheel 5 in addition to the openings 13, which openings 17 are introduced in a substantially tangential manner in relation to the circuit flow in the workspace 6 and extend substantially in the axial direction. They are also used for discharging working medium from the workspace 6, especially in the pumping operation of the retarder. The openings 13 can also be associated in this case with the aforementioned valves for adjusting a flow cross-section. The openings 17 open into a further working medium outlet 30. The working medium outlets 18, 30 and the annular channel or spiral channel 19 can be separated from one another against the transfer of working medium by means gap-type seals 27 in the region of the radially outer circumference of the two blade wheels 4, 5. Furthermore, the mentioned working medium outlets 18, 30 and the annular channel/spiral channel 19 can be connected with one another in a flow-conducting manner via lines and can especially be switched in parallel.

Figure 7:
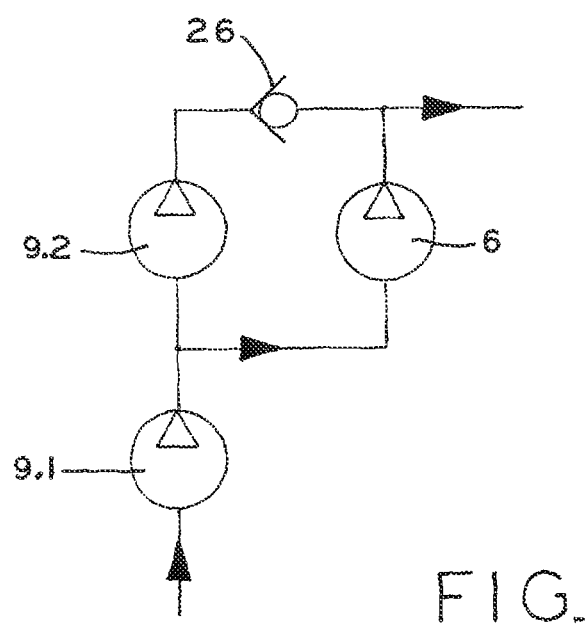
FIG. 7 shows an equivalent circuit diagram of a retarder in accordance with the invention.

FIG. 7 shows an equivalent circuit diagram of the arrangement according to FIG. 2. The reference numerals 6, 9.1 and 9.2 symbolically indicate the pumping effect of the individual components. The workspace 6 which has the pumping effect is switched in parallel in the present case with the upper region 9.2 of the blade 9 which offers the pumping effect. The bottom region 9.1 of the blade 9 which has the pumping effect is series-connected upstream of the former. A non-return valve 26 is provided in this case too.

Figure 8:
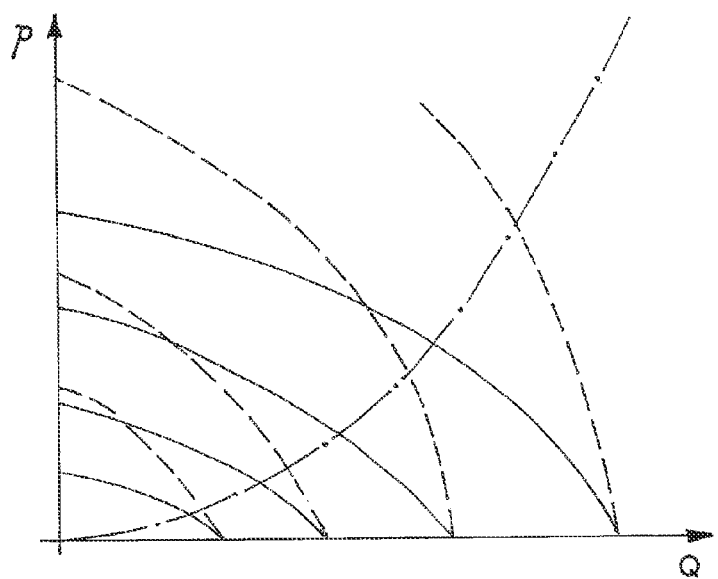
FIG. 8 shows a volume flow/pressure diagram of a retarder in accordance with the invention in pumping operation.

FIG. 8 shows a family of characteristics of a hydrodynamic retarder in accordance with the invention. The pressure of the working medium is shown in relation to the volume flow in pumping operation. In the present case, the unbroken lines show various characteristics at different speeds of the primary blade wheel of the hydrodynamic retarder, with the secondary blade wheel being entrained by the primary blade wheel. The broken lines on the other hand describe characteristics which are associated with the respective speeds of the primary blade wheel of the retarder when the secondary blade wheel is entrained, with the secondary blade wheel for example being at least partly retarded by the application of a braking torque, with a complete fixing of the secondary blade wheel being prevented for prolonged periods. The braking torque can be applied in a cycled manner over time or be increased in steps or continuously from a minimum braking torque to a maximum braking torque. Such a braking torque can be applied by electric, electromagnetic or permanent-magnet brakes. The dot-dash characteristic describes the flow resistance of the entire cooling circuit.

This shows that the ratio of the conveying volume flow Q of the retarder in braking operation to the one in pumping operation is chosen in such a way that the ratio is at least 1.5.

Figure 9:
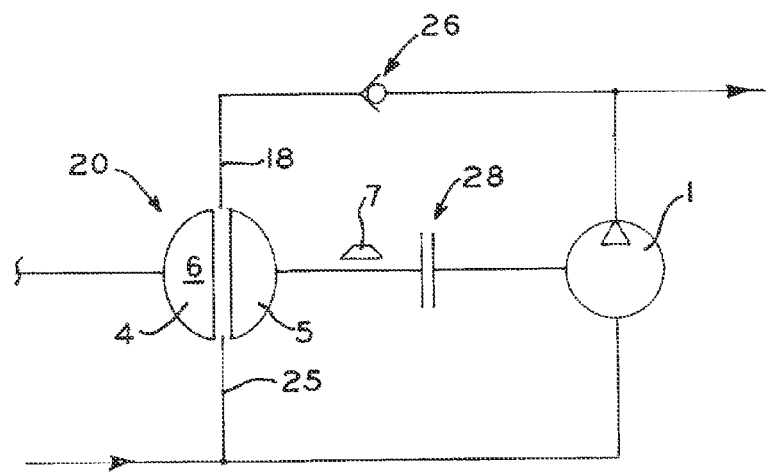
FIG. 9 shows a schematic view of a further embodiment of a vehicle cooling circuit in accordance with the invention.

FIG. 9 shows an alternative embodiment of a cooling circuit in accordance with the invention, wherein the features of the described embodiments can be combined with one another. A hydrodynamic coupling 20 is provided as an alternative to the retarder, which coupling also comprises a primary blade wheel 4 and a secondary blade wheel 5 which form a toroidal workspace which can be filled with working medium and be discharged therefrom. The filling is performed via the working medium inlet 25 and the discharge via the working medium outlet 18. In the present case, the hydrodynamic coupling 20 is arranged parallel to the cooling medium pump 1 in the cooling circuit. The hydrodynamic coupling 20 is in drive connection with the cooling medium pump 1, or it can be brought into such a connection, e.g. by means of a coupling 28. A brake 7 can be provided in the drive connection which is associated with the secondary blade wheel 5 or a coupling part of the coupling 28 which is provided in a torsion-proof manner with the secondary blade wheel 5. The secondary blade wheel can be fixed in braking operation by means of the brake 7 and can be released partly or fully in pumping operation, so that the functionality is similar to the one of the hydrodynamic retarder in accordance with the invention. Preferably, the coupling 20 is a clutch, with the coupling 20 being opened in braking operation, so that the drive connection between the hydrodynamic coupling 20 and the cooling medium pump 1 is interrupted, with the brake 7 being closed simultaneously so that the secondary blade wheel 5 is fixed and the hydrodynamic coupling 20 works as a hydrodynamic retarder. The coupling 28 is closed in pumping operation and brake 7 is released, so that depending on the degree of filling of the workspace 6 drive power is transferred from the primary blade wheel 4 hydrodynamically to the secondary blade wheel 5 in order to thus drive the cooling medium pump 1. The coupling 28 can also be arranged as a directional clutch which permits torque transfer in a first rotational direction and prevents this in an opposite rotational direction.

LIST OF REFERENCE NUMERALS

1 Cooling medium pump
2 Vehicle drive engine
3 Hydrodynamic retarder
4 Primary blade wheel
5 Secondary blade wheel
6 Workspace
7 Brake
8 Rear blading
9 Blade
9.1 Lower blade region
9.2 Upper blade region
10 Blade
11 Working blade chamber
12 Rear blade chamber
13 Openings
14 Working medium inlet
15 Working medium outlet
16 Separating gap
17 Openings
18 Working medium outlet
19 Spiral channel
20 Hydrodynamic coupling
21 Transmission
22 Compensating reservoir
23 Heat exchanger
24 Thermostat
25 Working medium inlet
26 Non-return valve
27 Gap-type seal
28 Coupling
29 Feed line
30 Working medium outlet

The invention claimed is:

1. A vehicle cooling circuit, comprising:
a cooling medium circulated by a cooling medium pump in the cooling circuit:
with one of a vehicle drive engine and another heat-generating assembly cooled by the cooling medium;
a hydrodynamic retarder, comprising a driven primary blade wheel and a secondary blade wheel, together forming a toroidal workspace fillable with a working medium and from which said working medium can be discharged in order to transfer torque hydrodynamically from said primary blade wheel to said secondary blade wheel, with
said working medium of the hydrodynamic retarder simultaneously also being the cooling medium of the cooling circuit, and
the hydrodynamic retarder simultaneously operating as the cooling medium pump and providing a pumping effect on the cooling medium for circulating the cooling medium in the cooling circuit;
wherein,
the secondary blade wheel is associated with one of a brake and a drive running counter to the drive of the primary blade wheel in such a way that the secondary blade wheel can, in a braking operation, be one of fixed by the brake and driven counter to the rotational direction of the primary blade wheel by the drive running counter to the drive of the primary blade wheel in order to hydrodynamically brake the primary blade wheel and, can, in a pumping operation, be one of partially and completely released such that the secondary blade wheel circulates at one of a speed of the primary blade wheel and a specified speed difference slower than the primary blade wheel together with the primary blade wheel in the same direction.

2. A vehicle cooling circuit according to claim 1, wherein the primary blade wheel carries a rear blading on a side facing away from the workspace.

3. A vehicle cooling circuit according to claim 2, wherein the primary blade wheel and the secondary blade wheel form a separating gap by means of which working medium is dischargeable from the workspace, and openings provided in a radially outer region of the primary blade wheel and the secondary blade wheel by means of which the working medium is dischargeable from the workspace substantially in one of a radial and an axial direction.

4. A vehicle cooling circuit according to claim 2, wherein the circuit is set up in such a way that a ratio of a conveying volume flow of the retarder in braking operation is at least 1.5 in relation to a conveying volume flow in pumping operation.

5. A vehicle cooling circuit according to claim 2, wherein each of a plurality of rear blades of the rear blading is arranged between two of a plurality of blades of the primary blade wheel.

6. A vehicle cooling circuit according to claim 5, wherein the primary blade wheel and the secondary blade wheel form a separating gap by means of which working medium is dischargeable from the workspace, and openings provided in a radially outer region of the primary blade wheel and the secondary blade wheel by means of which the working medium is dischargeable from the workspace substantially in one of a radial and an axial direction.

7. A vehicle cooling circuit according to claim 5, wherein the plurality of blades of the primary blade wheel delimit a plurality of working blade chambers, each of said plurality of working blade chambers delimited between an adjacent pair of the plurality of blades of the primary blade wheel and the plurality of rear blades of the rear blading form a plurality of rear blade chambers, each of the plurality of rear blade chambers formed between an adjacent pair of the plurality of rear blades, with the working blade chambers and the rear blade chambers being in flow-conducting connection with one another via openings in the primary blade wheel.

8. A vehicle cooling circuit according to claim 7, wherein the primary blade wheel and the secondary blade wheel form a separating gap by means of which working medium is dischargeable from the workspace, and openings provided in a radially outer region of the blade wheels by means of which the working medium is dischargeable from the workspace substantially in one of a radial and an axial direction.

9. A vehicle cooling circuit according to claim 7, wherein the openings form a working medium inlet and a working medium outlet, so that working medium will flow out of the workspace through the working medium outlet via the blades of the rear blading and the working medium inlet back into the workspace.

10. A vehicle cooling circuit according to claim 9, wherein the working medium outlet is provided radially on an inside in the primary blade wheel in a region of a front side of the blades with respect to the rotational direction of the primary blade wheel, whereas the working medium inlet is introduced in the primary blade wheel radially on an outside in a region of a rear side of the blades.

11. A vehicle cooling circuit according to claim 10, wherein the working medium inlet and the working medium outlet are arranged in a common one of the plurality of working blade chambers.

12. A vehicle cooling circuit according to claim 9, wherein the working medium inlet and the working medium outlet are arranged in a common one of the plurality of working blade chambers.

13. A vehicle cooling circuit according to claim 1, wherein the primary blade wheel and the secondary blade wheel form a separating gap by means of which working medium is dischargeable from the workspace, and openings provided in a radially outer region of the primary blade wheel and the secondary blade wheel by means of which the working medium is dischargeable from the workspace substantially in one of a radial and an axial direction.

14. A vehicle cooling circuit according to claim 13, wherein the separating gap and/or the openings open into a working medium outlet.

15. A vehicle cooling circuit according to claim 14, wherein the openings are connected in a flow-conducting manner with a spiral channel or open into such a channel.

16. A vehicle cooling circuit according to claim 13, wherein the openings are connected in a flow-conducting manner with a spiral channel or open into such a channel.

17. A vehicle cooling circuit according to claim 1, wherein the circuit is set up in such a way that a ratio of a conveying volume flow of the retarder in braking operation is at least 1.5 in relation to a conveying volume flow in pumping operation.

18. A vehicle cooling circuit, comprising:
a cooling medium circulated by a cooling medium pump in the cooling circuit;
with one of a vehicle drive engine and another heat-generating assembly cooled by the cooling medium;
a hydrodynamic coupling, comprising a driven primary blade wheel and a secondary blade wheel, together forming a toroidal workspace fillable with a working medium and from which said working medium can be discharged in order to transfer torque hydrodynamically from said primary blade wheel to said secondary blade wheel, with
said working medium of the hydrodynamic coupling simultaneously also being the cooling medium of the cooling circuit, and
the secondary blade wheel of the hydrodynamic coupling being connected in a torsion-proof manner with the cooling medium pump;
wherein,
the secondary blade wheel is associated with one of a brake and a drive running counter to the drive of the primary blade wheel in such a way that the secondary blade wheel can, in a braking operation, be one of fixed by the brake and driven counter to the rotational direction of the primary blade wheel by the drive running counter to the drive of the primary blade wheel in order to hydrodynamically brake the primary blade wheel and can, in a pumping operation, be one of partially and completely released such that the secondary blade wheel circulates at one of a speed of the primary blade wheel or at a specified speed difference slower than the primary blade wheel together with the primary blade wheel in the same direction.

* * * * *